(12) United States Patent
Weber et al.

(10) Patent No.: US 8,881,032 B1
(45) Date of Patent: Nov. 4, 2014

(54) GROUPED TAB DOCUMENT INTERFACE

(75) Inventors: Arnaud Claude Weber, Saratoga, CA (US); Alex Neely Ainslie, San Francisco, CA (US); Roma Rajni Shah, San Francisco, CA (US); Glen Murphy, Palo Alto, CA (US); David Andrew Trainor, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 557 days.

(21) Appl. No.: 13/314,137

(22) Filed: Dec. 7, 2011

(51) Int. Cl.
*G06F 17/00* (2006.01)

(52) U.S. Cl.
USPC ........... 715/760; 715/777; 715/738; 715/733; 715/764

(58) Field of Classification Search
USPC .......................................................... 715/760
See application file for complete search history.

(56) References Cited

U.S. PATENT DOCUMENTS

| | | | | |
|---|---|---|---|---|
| 5,745,716 | A * | 4/1998 | Tchao et al. .................. | 715/777 |
| 6,266,234 | B1 * | 7/2001 | Leman ..................... | 361/679.11 |
| 7,523,409 | B2 * | 4/2009 | Yolleck et al. ................ | 715/777 |
| 7,596,760 | B2 * | 9/2009 | Sauve et al. ................... | 715/777 |
| 7,752,572 | B1 * | 7/2010 | Shahrbabaki et al. ........ | 715/817 |
| 8,190,641 | B2 * | 5/2012 | Ponnappan et al. .......... | 707/786 |
| 2002/0093537 | A1 * | 7/2002 | Bocioned et al. ............. | 345/777 |
| 2004/0066414 | A1 * | 4/2004 | Czerwinski et al. .......... | 345/781 |
| 2004/0261035 | A1 * | 12/2004 | Emerson et al. .............. | 715/777 |
| 2006/0206834 | A1 * | 9/2006 | Fisher et al. .................. | 715/777 |
| 2006/0218500 | A1 * | 9/2006 | Sauve et al. ................... | 715/767 |
| 2006/0230356 | A1 * | 10/2006 | Sauve et al. ................... | 715/777 |
| 2006/0271858 | A1 * | 11/2006 | Yolleck et al. ................ | 715/738 |
| 2007/0067733 | A1 * | 3/2007 | Moore et al. .................. | 715/777 |
| 2007/0186175 | A1 * | 8/2007 | Hudson, Jr. ................... | 715/764 |
| 2007/0198947 | A1 * | 8/2007 | Cox et al. ...................... | 715/786 |
| 2008/0005686 | A1 * | 1/2008 | Singh ............................ | 715/764 |
| 2008/0040682 | A1 * | 2/2008 | Sorenson et al. ............. | 715/777 |
| 2008/0065514 | A1 * | 3/2008 | Eaton ............................ | 705/27 |
| 2008/0077879 | A1 * | 3/2008 | Black ............................ | 715/784 |
| 2009/0164934 | A1 * | 6/2009 | Bhattiprolu et al. ......... | 715/777 |
| 2009/0287559 | A1 * | 11/2009 | Chen et al. ................. | 705/14.23 |
| 2009/0327947 | A1 * | 12/2009 | Schreiner et al. ............ | 715/777 |
| 2010/0011313 | A1 * | 1/2010 | Sauve et al. ................... | 715/777 |
| 2010/0115451 | A1 * | 5/2010 | Moore et al. .................. | 715/777 |
| 2010/0180225 | A1 * | 7/2010 | Chiba et al. ................... | 715/777 |
| 2011/0129290 | A1 * | 6/2011 | Danko ........................... | 402/79 |
| 2011/0138313 | A1 * | 6/2011 | Decker et al. ................. | 715/777 |
| 2011/0161828 | A1 * | 6/2011 | Sauve et al. ................... | 715/738 |
| 2011/0167376 | A1 * | 7/2011 | Sauve et al. ................... | 715/777 |
| 2011/0173556 | A1 * | 7/2011 | Czerwinski et al. .......... | 715/771 |
| 2011/0314408 | A1 * | 12/2011 | Yolleck et al. ................ | 715/777 |

OTHER PUBLICATIONS

Weiss, "Tab Stacking is Here", retrieved from <http://my.opera.com/desktopteam/blog/tab-stacking-is-here>, Nov. 23, 2010.

\* cited by examiner

*Primary Examiner* — William Bashore
*Assistant Examiner* — Reza Nabi
(74) *Attorney, Agent, or Firm* — McDermott Will & Emery LLP

(57) ABSTRACT

Computer-implemented methods for grouping web page viewing windows in a web browser are provided. In one aspect, a computer-implemented method includes receiving a request to open a web page viewing window within a web browser that has multiple previously opened web page viewing windows. The method also includes automatically grouping each tab indicator associated with a subset of the web page viewing windows into a group based on an amount of viewable display space within the web browser to display each tab indicator associated with each of the web page viewing windows. Systems, graphical user interfaces, and machine-readable media are also provided.

17 Claims, 9 Drawing Sheets

GROUPED TAB DOCUMENT INTERFACE

BACKGROUND

1. Field

The present disclosure generally relates to the transmission of data over a network, and more particularly to the use of a computing device to display data communicated over a network.

2. Description of the Related Art

Many web browsers feature a tabbed document interface, where a user can open multiple tabbed windows within a web browser. Each tabbed window is used to view a web page. When a user opens a large number of new tabbed windows, the tab associated with each tabbed window either decreases in size so that all of the tabs can remain on screen within the web browser, and/or some of the tabs are moved off screen to create room on screen for the new tabs. The approach of decreasing the size of new tabs and/or moving old tabs off screen makes user interaction with tabs and user tracking of tabs difficult. This difficulty is even more acute with mobile devices, such as tablets and smart phones, where there is less viewable display space in which to display new tabs.

SUMMARY

According to one aspect of the disclosure, a computer-implemented method for grouping web page viewing windows in a web browser is disclosed. The method includes receiving a request to open a web page viewing window within a web browser that has multiple previously opened web page viewing windows. The method also includes automatically grouping each tab indicator associated with a subset of the web page viewing windows into a group based on a remaining amount of viewable display space within the web browser to display each tab indicator associated with each of the web page viewing windows.

According to another aspect of the disclosure, a system for grouping web page viewing windows in a web browser is disclosed. The system includes a memory for storing instructions to group web page viewing windows, and a processor. The processor is configured to execute the instructions to receive a request to open a web page viewing window within a web browser that has multiple previously opened web page viewing windows, and automatically group each tab indicator associated with a subset of the web page viewing windows into a stack of tab indicators based on a remaining amount of viewable display space within the web browser to display each tab indicator associated with each of the web page viewing windows.

According to a further aspect of the disclosure, a graphical user interface for grouping web page viewing windows in a web browser is disclosed. The graphical user interface includes a tab bar comprising multiple tab indicators, each tab indicator associated with a web page viewing window. When a request is received to open a web page viewing window within a web browser that has multiple previously opened web page viewing windows, a tab indicator associated with each of a subset of the web page viewing windows is automatically grouped into a stack of tab indicators based on a remaining amount of viewable display space within the web browser to display each tab indicator associated with each of the web page viewing windows.

According to yet a further of the disclosure, a machine-readable storage medium comprising machine-readable instructions for causing a processor to execute a method for grouping web page viewing windows in a web browser is disclosed. The method includes receiving a request to open a web page viewing window within a web browser that has multiple previously opened web page viewing windows. The method also includes automatically grouping each tab indicator associated with a subset of the web page viewing windows into a stack of tab indicators displayed in a tab bar based on a remaining amount of viewable display space within the web browser to display each tab indicator associated with each of the web page viewing windows.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed graphical user interface automatically stacks tab indicators (or "tabs") representing web page viewing windows together in a web browser when there is not enough display space to display each tab individually within the web browser. For example, if a user has 15 tabs open, and only five tabs can be individually displayed within the web browser in a format (e.g., font and tab size) that is readable to the user, then the remaining 10 tabs are stacked together, either on the left and/or right side of a tab bar area. A user can expand a tab stack by either selecting the tab stack (e.g., by pressing on the tab stack using a finger in a touchscreen interface, or clicking on the tab stack using a mouse), or dragging open (e.g., using a mouse or a finger) the tab stack. For example, if a user drags a tab stack on the right side of the tab bar towards the left, a predetermined number of tabs from the top of the tab stack will be displayed in the tab bar. The predetermined number of tabs previously in the tab bar will be moved to a tab stack on the left side of the tab bar. A user can thus open an unlimited number of tabs and have all of the tabs displayed within the web browser.

Figure 1:
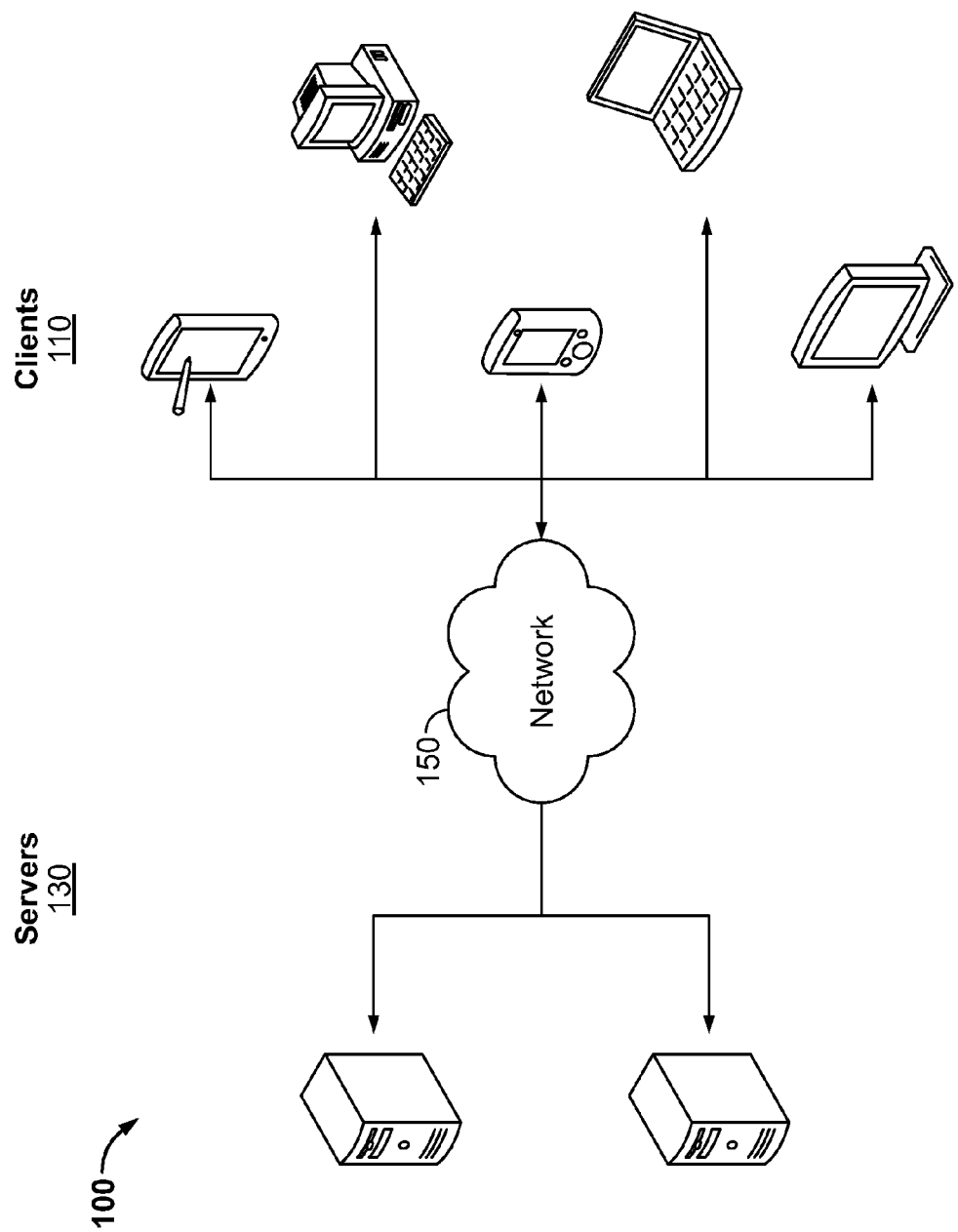
FIG. 1 illustrates an exemplary architecture for grouping web page viewing windows in a web browser.

Turning to the drawings, FIG. 1 illustrates an exemplary architecture 100 for grouping web page viewing windows in a web browser. The architecture 100 includes servers 130 and clients 110 connected over a network 150.

Each of the clients 110 is configured to download, install, and run a web browser as disclosed herein. The web browser is configured to run on clients 110 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. In certain aspects, certain advantages of the web browser, such as increased web page loading time in response to a query submission, are most salient on clients 110 that are mobile devices or that otherwise have limited display areas.

The web browser, once installed on a client 110, is configured to load web pages from any one or multiple servers 130 hosting the web pages. The servers 130 can be any device having an appropriate processor, memory, and communications capability for hosting the data for installing the web browser and for hosting the web pages. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed web browser, once downloaded from a server 130 and installed and executed on a client 110, is configured to display tab indicators to represent opened web page viewing windows, and automatically group tab indicators together into a stack of tab indicators. The tab indicators are grouped into a stack when there is insufficient space available in the web browser to display each tab indicator individually in a user friendly format, such as where text or an image represented on a tab will be too small for a user to view. Stacked tab indicators can be ungrouped based on a user input, and ungrouped tab indicators can be grouped into a stack based on a user input.

Figure 2:
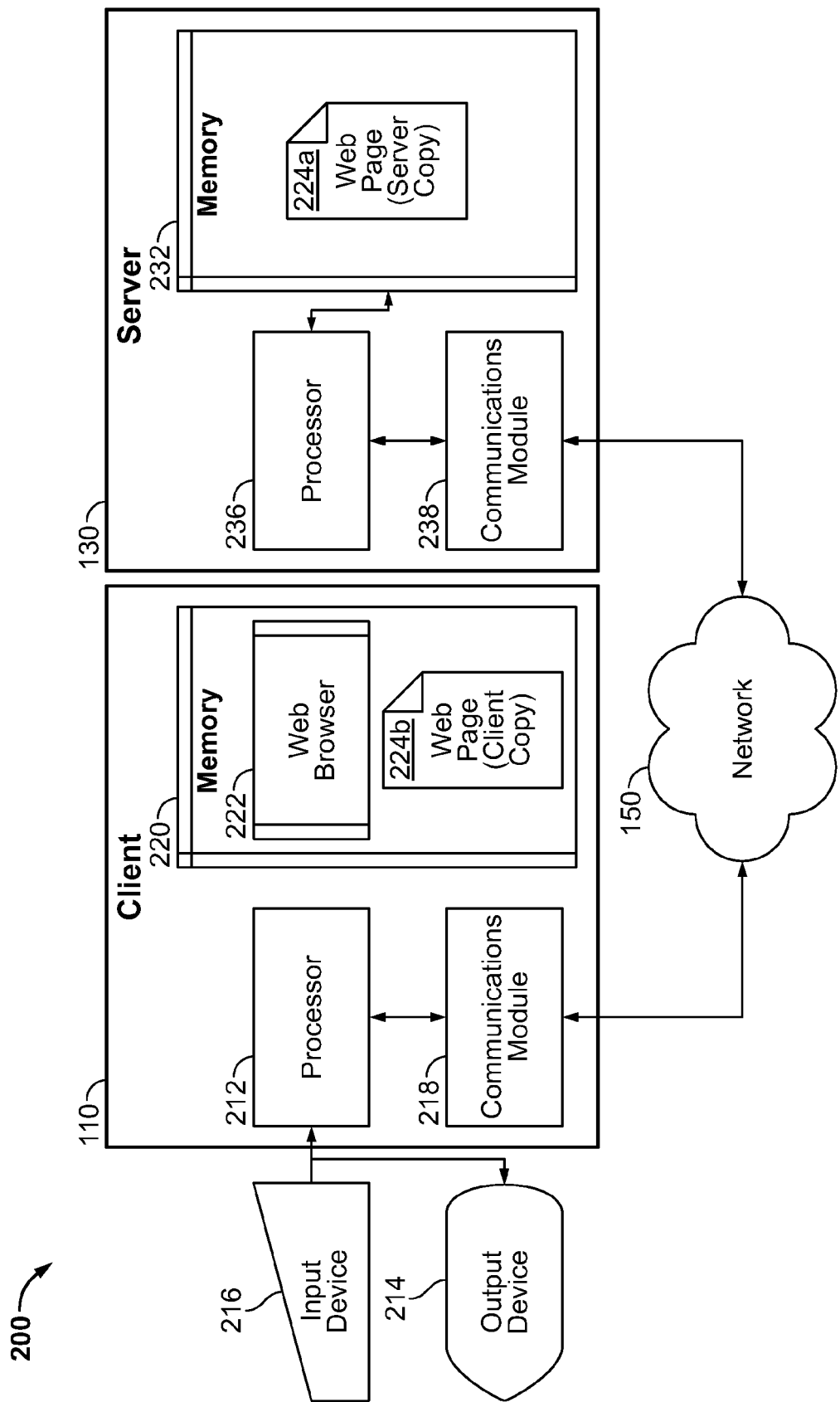
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220. The memory 220 includes a web browser 222 and a client copy of a web page 224b to display in the web browser 222 using the output device 214 (e.g., a display) of the client 110. The client 110 also includes an input device 216, such as a keyboard, touchscreen, or mouse. The client copy of the web page 224b is obtained over the network 150 from a server copy of the web page 224a stored on the server 130. The processor 212 of the client 110 is configured to execute instructions, such as instructions physically coded into the processor 212, instructions received from software in memory 220, or a combination of both. For example, the processor 212 of the client 110 executes instructions from the web browser 222 to receive a request (e.g., from a user using input device 216) to open a single web page viewing window within the web browser 222 that has multiple web page viewing windows opened, or a request to open multiple web page viewing windows (e.g., within the web browser 222 with one, none, or multiple web page viewing windows opened). The processor 212 is also configured to automatically group a tab indicator associated with each of a subset of the web page viewing windows into a group of tab indicators based on an amount of viewable display space within the web browser to display each tab indicator associated with each of the web page viewing windows. In certain aspects, the group of tab indicators excludes the tab indicator associated with the opened web page viewing window. The group of tab indicators can be displayed as a stack (e.g., a vertical arrangement of tabs), a shelf (e.g., a horizontal arrangement of tabs), or another suitable grouping display known to those of ordinary skill in the art. The stack of tab indicators can be displayed, using output device 214, on a leftmost side or a rightmost side of a tab bar that includes each of the tab indicators, or on both sides of the tab bar. In certain aspects, multiple stacks of tab indicators can be displayed separately in any area of the tab bar.

The processor 212 is also configured to ungroup tab indicators for a subset of web page viewing windows based on an input from a user, as well as group tab indicators for another subset web page viewing windows in response to the ungrouping of the tab indicators for the subset of the web page viewing windows. The processor 212 can display, on the output device 214, each of the ungrouped tab indicators individually in proportion to the remaining ungrouped tab indicators based on an amount of display space of the tab bar. The input from the user can be, for example, a selection of a tab indicator from a stack of tab indicators. The selection can be made by touching one of the tab indicators using a touch input device 216 or by clicking on one of the tab indicators using a mouse 216. The input from the user can also be, for example, a dragging motion (e.g., using a touch input or mouse) of a tab indicator from one side of the tab bar to the other side of the tab bar. The tab indicator in the tab bar that is dragged can be a tab indicator in a stack of tab indicators, or a tab indicator outside of a stack of tab indicators.

Figure 3:
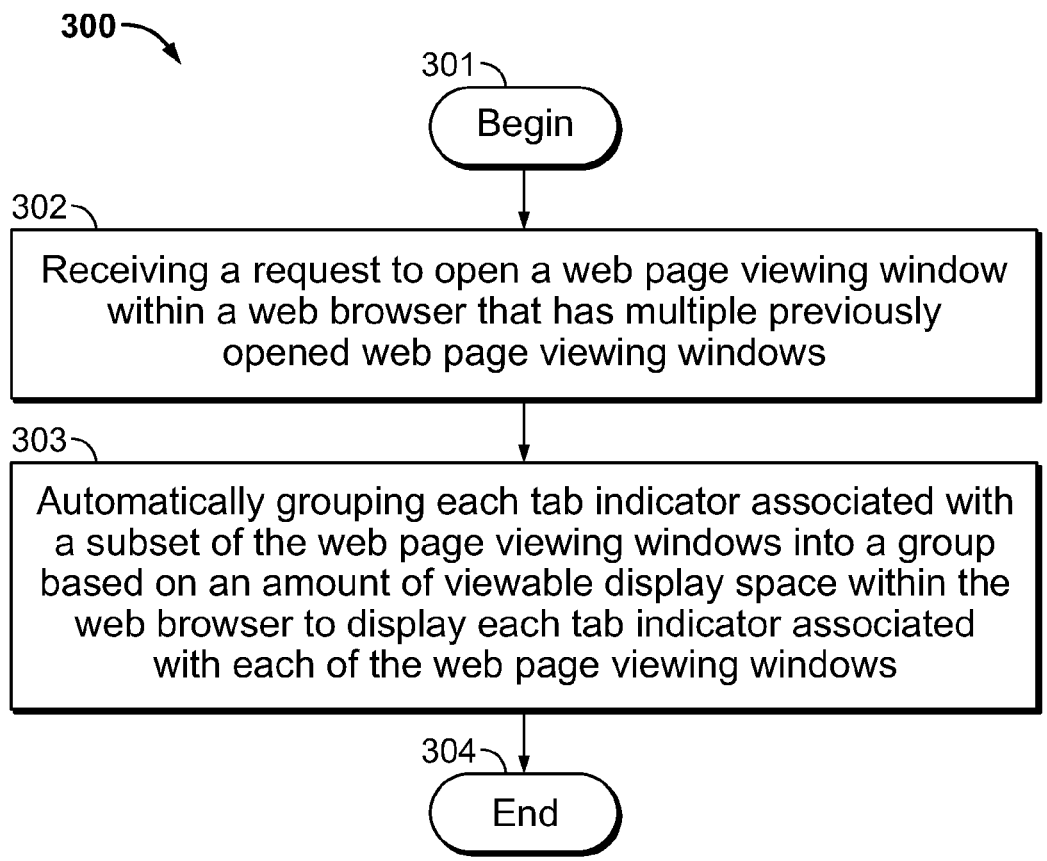
FIG. 3 illustrates an exemplary process for grouping web page viewing windows in a web browser using an exemplary client of FIG. 2.

FIG. 3 illustrates an exemplary process 300 for grouping web page viewing windows in a web browser using the exemplary client 110 of FIG. 2. The process 300 begins by proceeding from step 301 when a user opens a web browser 222 to step 302 when a request is received to open a web page viewing window within a web browser 222 that has multiple web page viewing windows already open. The request can be received from another program or otherwise outside of the web browser 222, where in response to the request the web browser 222 opens with multiple web page viewing windows, or the request can be received within the web browser 222, where one, none, or multiple web page viewing windows are open. In step 303, a tab indicator associated with each of a subset of the web page viewing windows is automatically grouped into a group based on an amount of viewable display space within the web browser 222 to individually display each tab indicator associated with each of the web page viewing windows. The process 300 then ends in step 304.

Figure 4A:
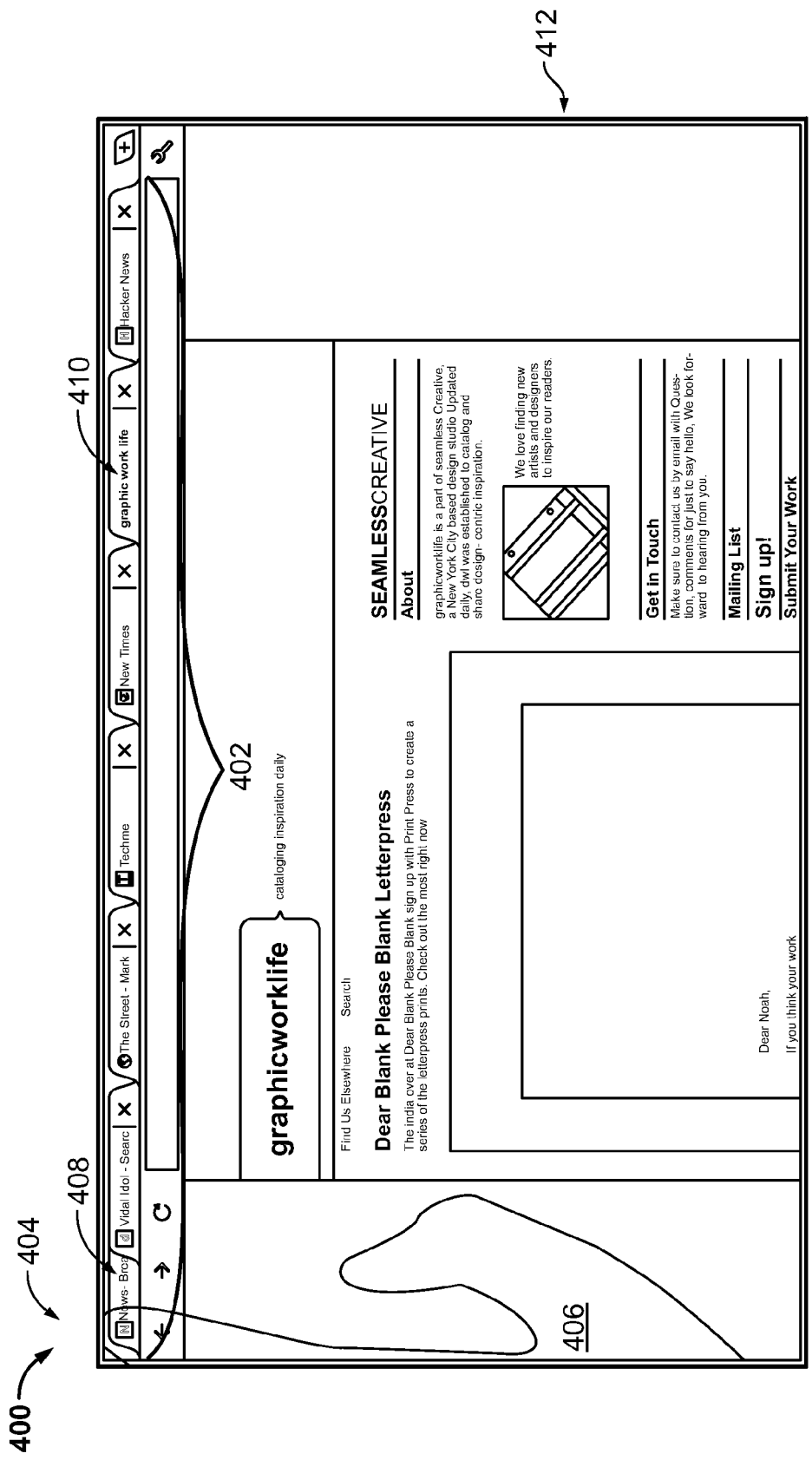
FIGS. 4A-4E are exemplary screenshots associated with the exemplary process of FIG. 3.

FIG. 3 sets forth an exemplary process 300 for grouping web page viewing windows in a web browser using the exemplary client 110 of FIG. 2. An example will now be described using the exemplary process 300 of FIG. 3. The process 300 begins by proceeding from step 301 when a user opens a web browser 222 to step 302 when a request to open multiple web page viewing windows is received because the multiple web page viewing windows were open in a previous session of the web browser 222. The request itself includes multiple, serially executed, single requests to open a web page viewing window within the web browser, but to the user appears to be a request to open multiple web page viewing windows within the browser. The user's re-opening of the web browser 222 causes the web browser 222 to re-open each of the previously opened web page viewing windows from the previous session. In step 303, a tab indicator associated with each of a subset of the web page viewing windows is automatically grouped into a group based on an amount of viewable display space within the web browser 222 to individually display each tab indicator associated with each of the web page viewing windows. FIG. 4A illustrates an exemplary screenshot 400 of the web browser 222. The tab indicators are displayed in a tab bar 402, and a stack of tab indicators 404 is displayed on the leftmost side of the tab bar 402. The process 300 then ends in step 304.

Figure 4B:
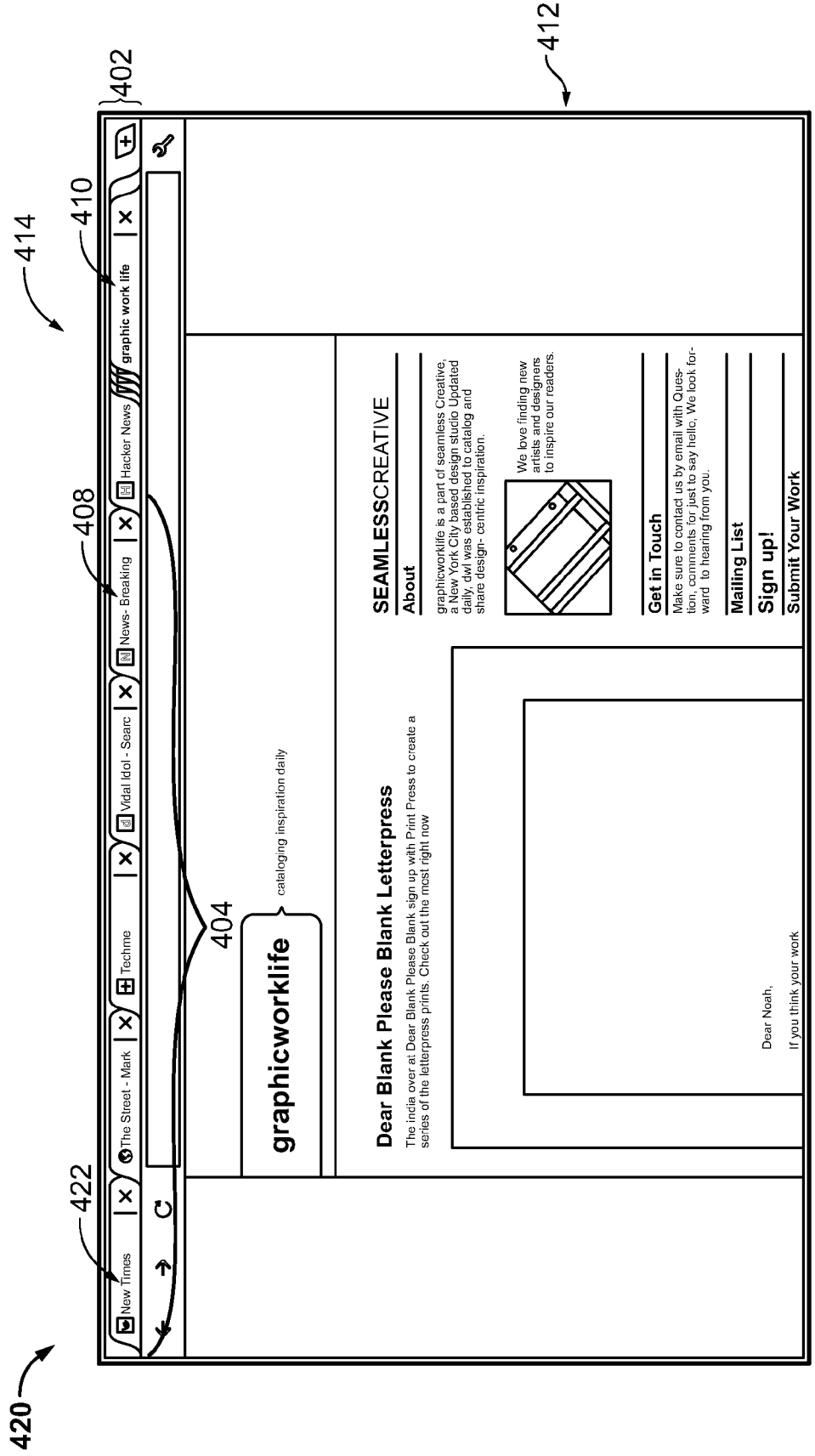

Certain exemplary features associated with the disclosed web browser 222 will now be described with reference to FIGS. 4A-4E. For example, a group of tab indicators can be ungrouped and regrouped in various ways. With reference to the screenshot 400 of FIG. 4A, a stack of tab indicators 404 can be ungrouped by a user touching a tab indicator 408 included in the stack of tab indicators 404 using a touch input 406. In response, and as illustrated in FIG. 4B, another exemplary screenshot 420, the stack of tab indicators 404 is expanded towards the right side. The tab indicator 408 that was previously on top of the stack of tab indicators 404 in FIG. 4A is moved towards the right in FIG. 4B, and each of the tab indicators from the stack of tab indicators 404 is individually displayed in the tab bar 402. Each of the tab indicators from the stack of tab indicators 404 is displayed in proportion (e.g., size and shape) to the remaining ungrouped tab indicators based on an amount of display space in the tab bar 402. The web page viewing window 412 that was displayed in FIG. 4A remains the same in FIG. 4B. The remaining tab indicators in the tab bar 402 in FIG. 4B have been automatically stacked 414. A tab indicator 410 that was ungrouped in FIG. 4A is now grouped and on top of the stack 414 of the remaining tab indicators in the tab bar 402 of FIG. 4B.

Figure 4C:
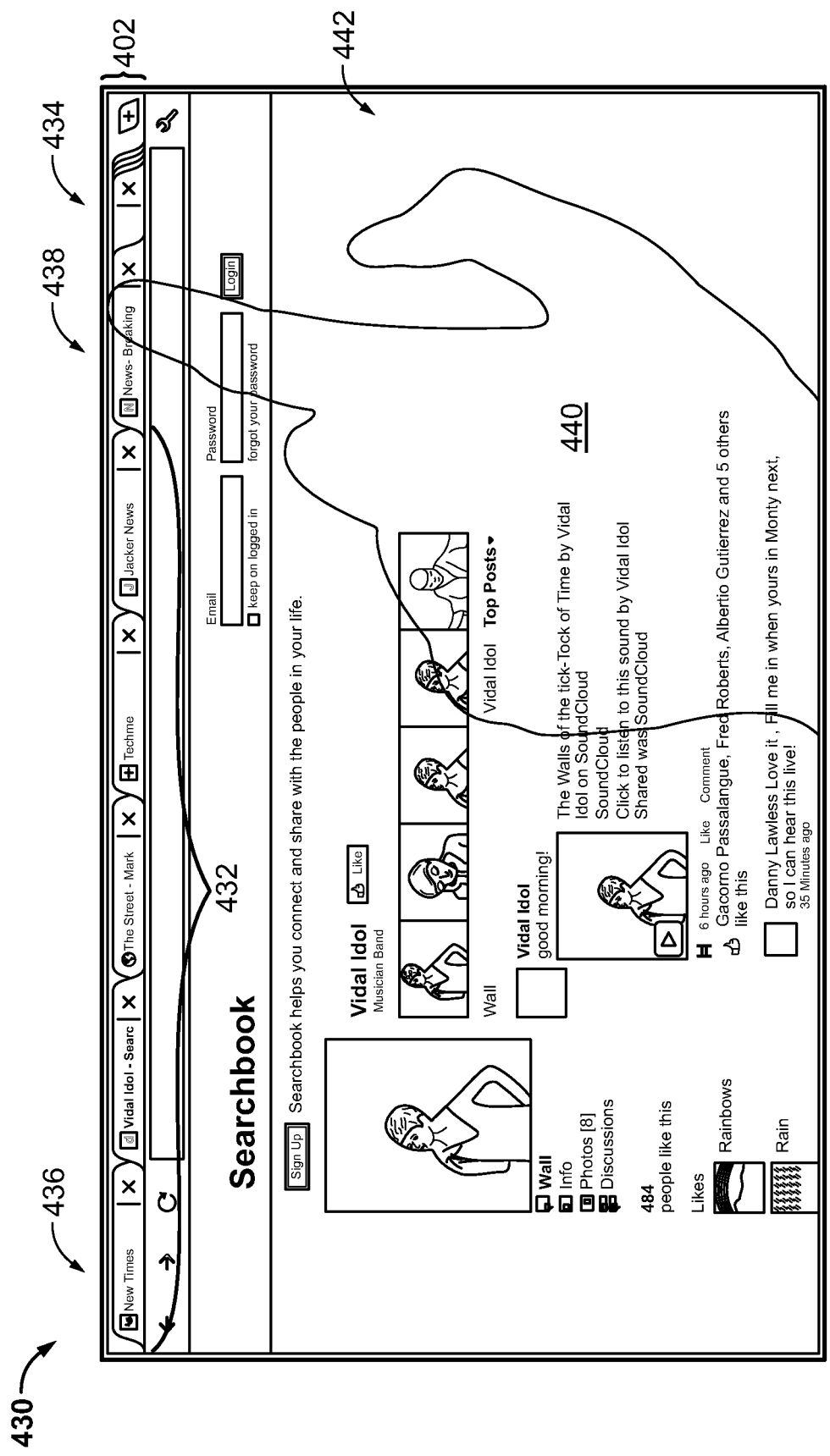
Figure 4D:
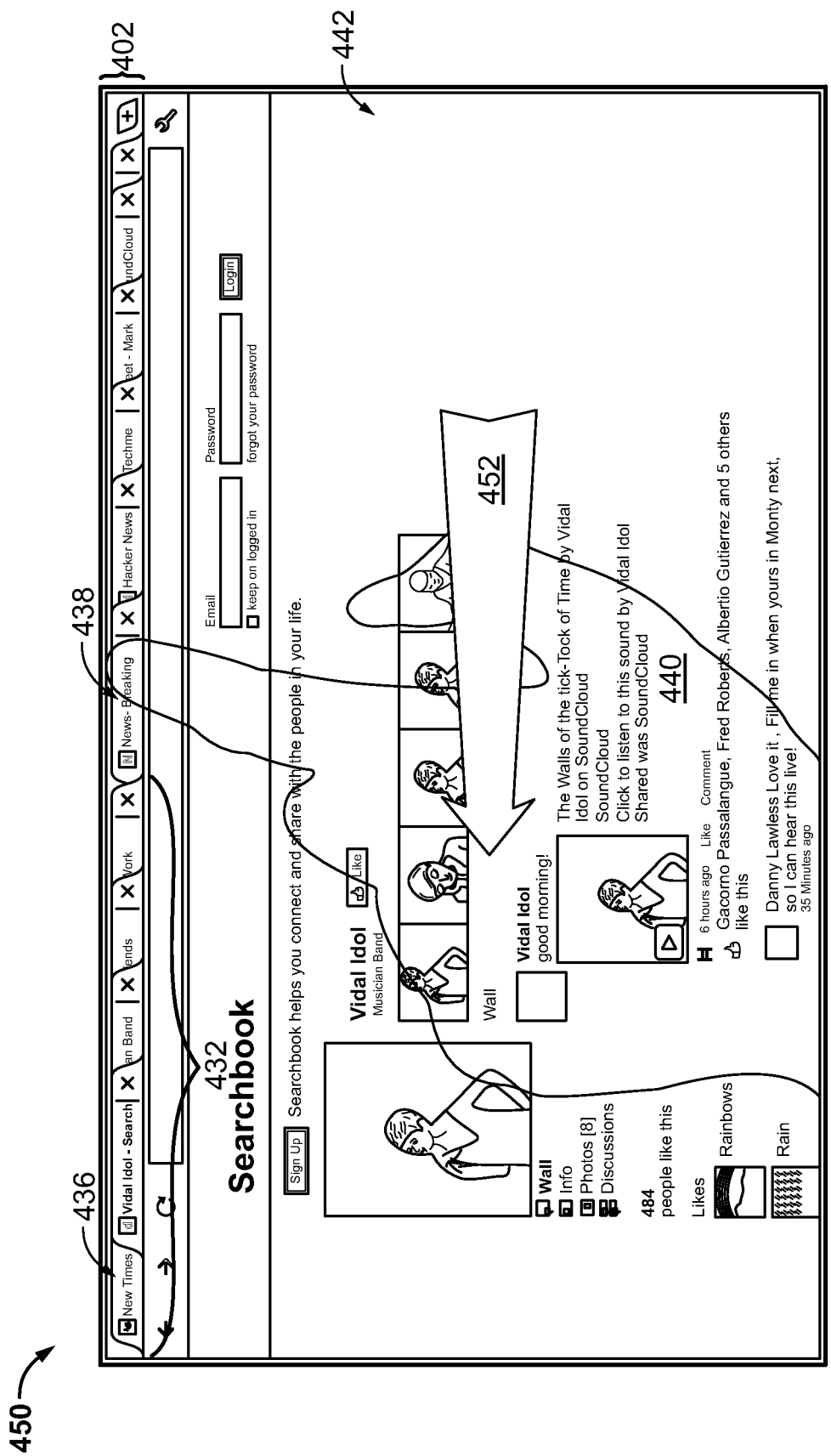

With reference to the screenshot 430 of FIG. 4C, a stack of tab indicators 434 can be ungrouped by a user touching a selected tab indicator 438 using a touch input 440 and dragging the tab indicator 438 from one side of the tab bar 402 to the other side of the tab bar 402. The selected tab indicator that is dragged does not need to be a grouped tab indicator. As illustrated in FIG. 4D, another exemplary screenshot 450 of the web browser, as the user drags the tab indicator 438 in a direction 452 towards to the other side of the tab bar 402 away from the stack 434, the previously ungrouped tab indicators 432 of FIG. 4C are proportionally overlapped with one another in FIG. 4D as the tab indicator 438 is dragged in the direction 452 towards to the other side of the tab bar 402 away from the stack 434 in such a way as to partially cover, for example, the leftmost tab 436. The web page viewing window 442 that was displayed in FIG. 4C remains the same in FIG. 4D. If the user releases the tab indicator in the position illustrated in FIG. 4D (e.g., by lifting the user's touch input 440 from the touchscreen), the tab indicators would return to the positions illustrated in FIG. 4C. Dragging of a tab indicator also allows a user to change the order in which tab indicators are displayed. For example, dragging a tab indicator allows a user to change the position of a tab indicator from between a first set of tab indicators to another position between another set of tab indicators, which can affect how the tab indicators are ordered in a group. A user can also directly change the order of tab indicators already in a group, for example, by using a long tap (e.g., long press) touch input to re-order tab indicators in the group.

Figure 4E:
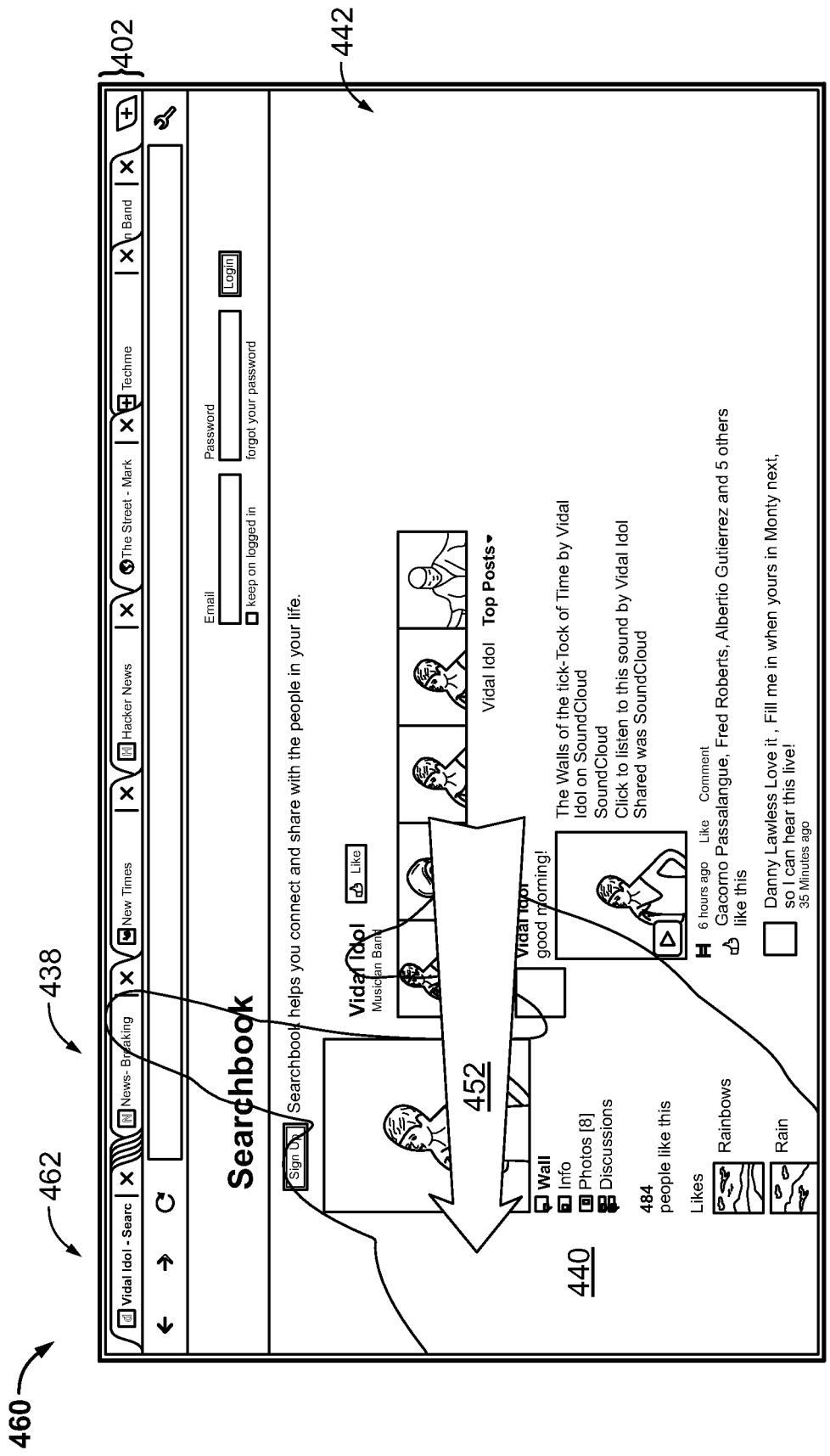

FIG. 4E is an exemplary screenshot 460 illustrating the web browser 222 of FIG. 4C after the user has completed the touch input 440 dragging motion 452 of the tab indicator 438 towards the other side of the tab bar 402 away from the stack 434 of FIG. 4C. Each tab indicator from the stack of tab indicators 434 of FIG. 4C is individually displayed, and the remaining tab indicators in the tab bar 402 are grouped into a stack of tab indicators 462 on the other side of the tab bar 402. The left most tab 436 of FIGS. 4C and 4D is now within the stack of tab indicators 462 on the other side of the tab bar 402. The web page viewing window 442 that was displayed in FIGS. 4C and 4D remains the same in FIG. 4E.

Additional implementation details related to tab indicators will now be described. In certain aspects, in order to further facilitate tab indicators appearing responsive to a user's touch input, the display of a selected (e.g., touched) tab indicator that is scrolled moves along with the user's finger, creating the appearance of the user pressing down and dragging that particular tab indicator. If, however, the selected tab indicator is in a group on a side of the tab bar, all of the tab indicators between the selected tab indicator and the other end of the tab bar are scrolled over (e.g., about 250 ms per scrolled tab indicator) until the selected tab indicator is no longer surrounded by grouped tabs on either side. While the tab indicators are scrolled, the touch delta relative to the initial touch point is monitored, which allows for the updating of the final point of this quick scroll to the current position of the user's finger/touch. Thus, the user does not really perceive that the selected tab is not being moved while the grouped tabs are expanded to make the selected tab visible.

Additionally, in order to allow a user to drag a tab indicator into a group of tab indicators, tab indicators are scrolled when the user moves the currently selected tab indicator near the edge of the tab bar. The closer the user gets to the edge of the tab bar, the faster tab indicators are scrolled, allowing the user to fine tune dragging and dropping of the selected tab indicator.

Furthermore, when a new tab indicator is created, previously existing tab indicators are scrolled in order to ensure that the previously selected tab indicator is not grouped, and is visible. This allows a user to easily toggle between the new tab indicator and the previously selected tab indicator.

Figure 5:
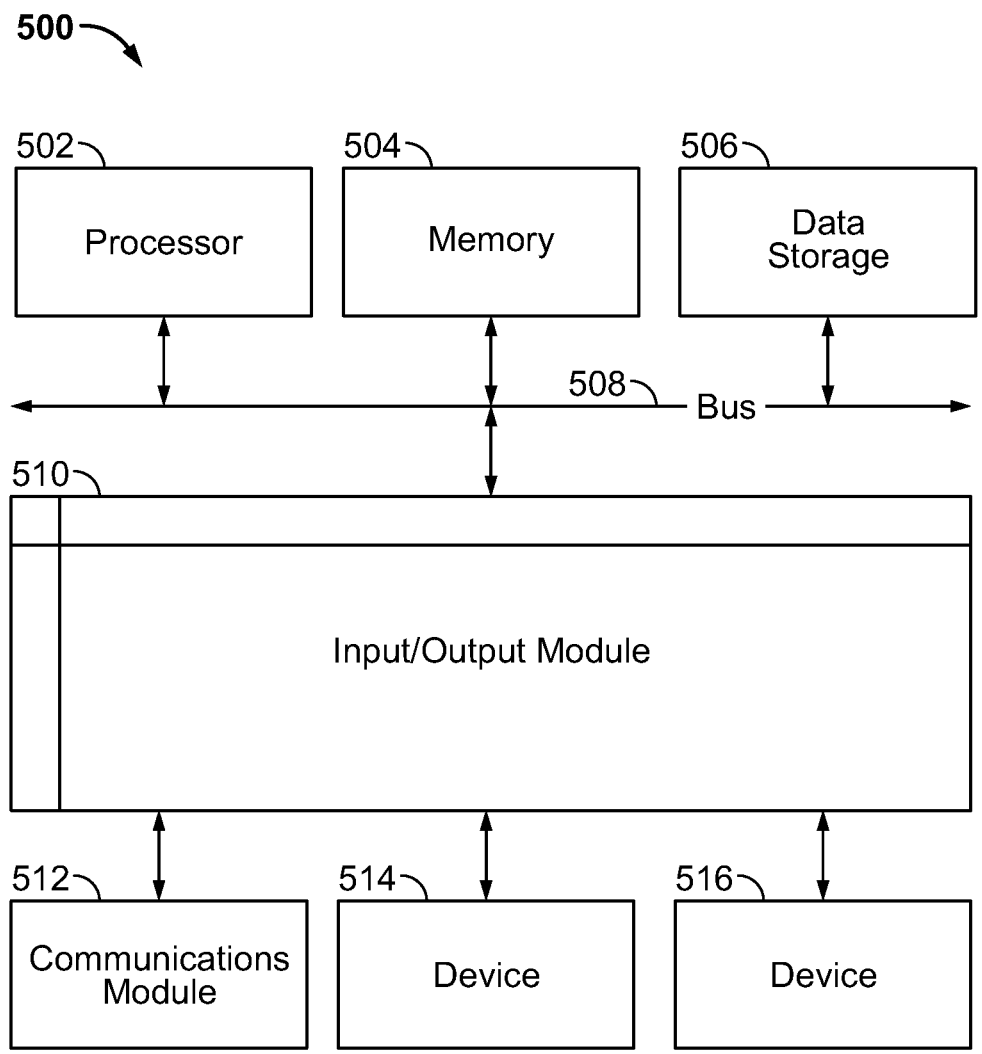
FIG. 5 is a block diagram illustrating an exemplary computer system with which the client and server of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to multiple devices, such as an input device 514 (e.g., input device 216) and/or an output device 516 (e.g., output device 214).

Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the clients 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, computer-implemented methods, user interfaces, and machine-readable media for grouping web page viewing windows in a web browser have been described. A web browser that includes multiple web page viewing windows automatically groups tab indicators for a subset of the web page viewing windows into a group, such as a stack. The stack, which can be located on either or both sides of a tab bar, can be ungrouped and regrouped based on certain user inputs. Similarly, ungrouped tab indicators can be grouped and ungrouped using similar user inputs.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for grouping web page viewing windows in a web browser, the method comprising:
   receiving a request to open a web page viewing window within a web browser that has multiple previously opened web page viewing windows; and
   automatically grouping each tab indicator associated with a subset of the web page viewing windows into a group based on an amount of viewable display space within the web browser to display each tab indicator associated with each of the web page viewing windows,
   wherein the group of tab indicators is represented as a plurality of tab indicators in a stack displayed on at least one of a leftmost side or a rightmost side of a tab bar comprising each of the tab indicators, wherein at least a portion of at least two tab indicators is visible in the stack, wherein one of the plurality of tab indicators appears on top of another of the plurality of tab indicators in the stack, and wherein an order of the plurality of tab indicators in the stack is changeable by a user providing a long input selection of at least one tab indicator in the plurality of tab indicators in the stack,
   wherein each tab indicator associated with the subset of the web page viewing windows is automatically grouped into the stack based on a remaining amount of viewable display space within the web browser to display each tab indicator associated with each of the web page viewing windows, and
   wherein the group of tab indicators excludes a tab indicator associated with the opened web page viewing window.

2. The computer-implemented method of claim 1, wherein a stack of tab indicators is displayed on both the leftmost side and a rightmost side of the tab bar comprising each of the tab indicators.

3. The computer-implemented method of claim 1, further comprising:
   ungrouping tab indicators for the subset of web page viewing windows based on an input from a user; and
   grouping tab indicators for another subset web page viewing windows in response to the ungrouping of the tab indicators for the subset of the web page viewing windows.

4. The computer-implemented method of claim 3, wherein a display of each of the ungrouped tab indicators is proportional to the remaining ungrouped tab indicators based on an amount of display space of the tab bar comprising each of the tab indicators.

5. The computer-implemented method of claim 3, wherein the input from the user comprises a selection of a tab indicator, in a first position on the tab bar, from a stack of tab indicators, and a release of the tab indicator in substantially the same position as the first position on the tab bar.

6. The computer-implemented method of claim 3, wherein the input from the user comprises a dragging motion of a tab indicator from a first position near one side of the tab bar comprising each of the tab indicators to the other side of the tab bar.

7. The computer-implemented method of claim 6, wherein the tab indicator is from a stack of tab indicators.

8. The method of claim 6, wherein when the dragging motion of the tab indicator from the one side of the tab bar is released prior to the tab indicator from the one side of the tab bar reaching the other side of the tab bar, the tab indicator returns to the first position.

9. A system for grouping web page viewing windows in a web browser, the system comprising:
    a memory for storing instructions to group web page viewing windows; and
    a processor configured to execute the instructions to:
        receive a request to open a web page viewing window within a web browser that has multiple previously opened web page viewing windows; and
        automatically group each tab indicator associated with a subset of the web page viewing windows into a stack of tab indicators based on an amount of viewable display space within the web browser to display each tab indicator associated with each of the web page viewing windows,
        wherein the stack of tab indicators is represented by a plurality of tab indicators displayed on at least one of a leftmost side or a right most side of a tab bar comprising each of the tab indicators, wherein at least a portion of at least two tab indicators is visible in the stack, wherein one of the plurality of tab indicators appears on top of another of the plurality of tab indicators in the stack, and wherein an order of the plurality of tab indicators in the stack is changeable by a user providing a long input selection of at least one tab indicator in the plurality of tab indicators in the stack,
        wherein each tab indicator associated with the subset of the web page viewing windows is automatically grouped into the stack based on a remaining amount of viewable display space within the web browser to display each tab indicator associated with each of the web page viewing windows, and
        wherein the group of tab indicators excludes a tab indicator associated with the opened web page.

10. The system of claim 9, wherein the processor is further configured to:
    ungroup tab indicators for the subset of web page viewing windows based on an input from a user; and
    group tab indicators for another subset web page viewing windows in response to the ungrouping of the tab indicators for the subset of the web page viewing windows.

11. The system of claim 10, wherein the processor is configured to display each of the ungrouped tab indicators proportional to the remaining ungrouped tab indicators based on an amount of display space of the tab bar comprising each of the tab indicators.

12. The system of claim 10, wherein the input from the user comprises a selection of a tab indicator, in a first position on the tab bar, from a stack of tab indicators, and a release of the tab indicator in substantially the same position as the first position on the tab bar.

13. The system of claim 10, wherein the input from the user comprises a dragging motion of a tab indicator from a first position near one side of the tab bar comprising each of the tab indicators to the other side of the tab bar.

14. The system of claim 13, wherein the tab indicator is from a stack of tab indicators.

15. The system of claim 13, wherein when the dragging motion of the tab indicator from the one side of the tab bar is released prior to the tab indicator from the one side of the tab bar reaching the other side of the tab bar, the tab indicator returns to the first position.

16. A device comprising:
    a processor; and
    a display device configured by the processor to display a tab bar comprising multiple tab indicators, each tab indicator associated with a web page viewing window,
    wherein, when a request is received to open a web page viewing window within a web browser that has multiple previously opened web page viewing windows, a tab indicator associated with each of a subset of the web page viewing windows is automatically grouped into a stack of tab indicators based on an amount of viewable display space within the web browser to display each tab indicator associated with each of the web page viewing windows, and
    wherein the stack of tab indicators is represented by a plurality of tab indicators displayed on at least one of a leftmost side or a right most side of the tab bar comprising each of the tab indicators, wherein at least a portion of at least two tab indicators is visible in the stack, wherein one of the plurality of tab indicators appears on top of another of the plurality of tab indicators in the stack, and wherein an order of the plurality of tab indicators in the stack is changeable by a user providing a long input selection of at least one tab indicator in the plurality of tab indicators in the stack,
    wherein each tab indicator associated with the subset of the web page viewing windows is automatically grouped into the stack based on a remaining amount of viewable display space within the web browser to display each tab indicator associated with each of the web page viewing windows, and
    wherein the group of tab indicators excludes a tab indicator associated with the opened web page.

17. A non-transitory machine-readable storage medium comprising machine-readable instructions for causing a processor to execute a method for grouping web page viewing windows in a web browser, comprising:
    receiving a request to open a web page viewing window within a web browser that has multiple previously opened web page viewing windows; and
    automatically grouping each tab indicator associated with a subset of the web page viewing windows into a stack of tab indicators displayed in a tab bar based on an amount of viewable display space within the web browser to display each tab indicator associated with each of the web page viewing windows,
    wherein the stack of tab indicators is represented by a plurality of tab indicators displayed on at least one of a leftmost side or a right most side of the tab bar comprising each of the tab indicators, wherein at least a portion of at least two tab indicators is visible in the stack, wherein one of the plurality of tab indicators appears on top of another of the plurality of tab indicators in the stack, and wherein an order of the plurality of tab indicators in the stack is changeable by a user providing a long input selection of at least one tab indicator in the plurality of tab indicators in the stack,
    wherein each tab indicator associated with the subset of the web page viewing windows is automatically grouped into the stack based on a remaining amount of viewable display space within the web browser to display each tab indicator associated with each of the web page viewing windows, and
    wherein the group of tab indicators excludes a tab indicator associated with the opened web page.

* * * * *